(12) United States Patent
Greenberg

(10) Patent No.: US 10,498,417 B2
(45) Date of Patent: Dec. 3, 2019

(54) METHODS FOR COMMUNICATION AND COMMUNICATION DEVICES

(71) Applicant: Intel IP Corporation, Santa Clara, CA (US)

(72) Inventor: Maxim Greenberg, Atlit (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/777,237

(22) PCT Filed: Dec. 21, 2015

(86) PCT No.: PCT/US2015/066973

§ 371 (c)(1),
(2) Date: May 18, 2018

(87) PCT Pub. No.: WO2017/111883

PCT Pub. Date: Jun. 29, 2017

(65) Prior Publication Data

US 2018/0359012 A1 Dec. 13, 2018

(51) Int. Cl.
*H04B 7/06* (2006.01)
*H04B 7/0408* (2017.01)
*H04B 7/08* (2006.01)

(52) U.S. Cl.
CPC ......... *H04B 7/0617* (2013.01); *H04B 7/0408* (2013.01); *H04B 7/0695* (2013.01); *H04B 7/088* (2013.01)

(58) Field of Classification Search
CPC combination set(s) only.
See application file for complete search history.

(56) References Cited

U.S. PATENT DOCUMENTS 7,447,270 B1 * 11/2008 Hottinen ............ H04B 7/0634
375/141
2004/0014429 A1 * 1/2004 Guo .................... H04B 7/0632
455/73

(Continued)

FOREIGN PATENT DOCUMENTS

JP 2013538492 A 10/2013
WO 2015110211 A1 7/2015

OTHER PUBLICATIONS

International Search Report based on application No. PCT/US2015/066973 (12 pages) dated Aug. 24, 2016 (Reference Purpose Only).

(Continued)

*Primary Examiner* — Wednel Cadeau
(74) *Attorney, Agent, or Firm* — Viering, Jentschura & Partner mbB

(57) ABSTRACT

According to one example, a communication method is described comprising receiving a message from a sender transmitted in each of a plurality of transmit antenna main beam directions and determining reception qualities of the messages. The method further comprises identifying a subset of a plurality of transmit antenna main beam directions based on the reception qualities of the messages, wherein the subset includes multiple transmit antenna main beam directions of the plurality of transmit antenna main beam directions, performing, for each transmit antenna main beam direction of the subset, a beam training procedure to determine an antenna weight vector for the transmit antenna main beam direction and performing a communication based on one of the determined antenna weight vectors.

22 Claims, 9 Drawing Sheets

(56) References Cited

U.S. PATENT DOCUMENTS

| | | |
|---|---|---|
| 2008/0153428 A1 | 6/2008 | Han et al. |
| 2012/0106474 A1* | 5/2012 | Wu .................... H04B 7/0617 370/329 |
| 2013/0083865 A1 | 4/2013 | Wu et al. |
| 2013/0315325 A1 | 11/2013 | Wang et al. |
| 2015/0244432 A1 | 8/2015 | Wang |
| 2016/0190686 A1* | 6/2016 | Gao ........................ H01Q 3/24 342/374 |

OTHER PUBLICATIONS

European Search Report retrieved for application No. 15911579.9, dated May 15, 2019, 10 pages (for informational purpose only).

\* cited by examiner

METHODS FOR COMMUNICATION AND COMMUNICATION DEVICES

CROSS-REFERENCE TO RELATED APPLICATION

The present application is a national stage entry according to 35 U.S.C. § 371 of PCT application No.: PCT/US2015/066973 filed on Dec. 21, 2015, and is incorporated herein by reference in its entirety and for all purposes.

TECHNICAL FIELD

Embodiments described herein generally relate to methods for communication and communication devices.

BACKGROUND

To increase the throughput in cellular communication systems, the usage of millimeter (mm) wave signals for radio transmission is considered. Since millimeter wave signals are typically more vulnerable to propagation loss than radio signals of longer wavelengths, the usage of directional antennas, i.e. beam forming, is considered, which however requires a mechanism to align the transmission path and the receiver antenna. Approaches to allow the efficient usage of beam forming are therefore desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
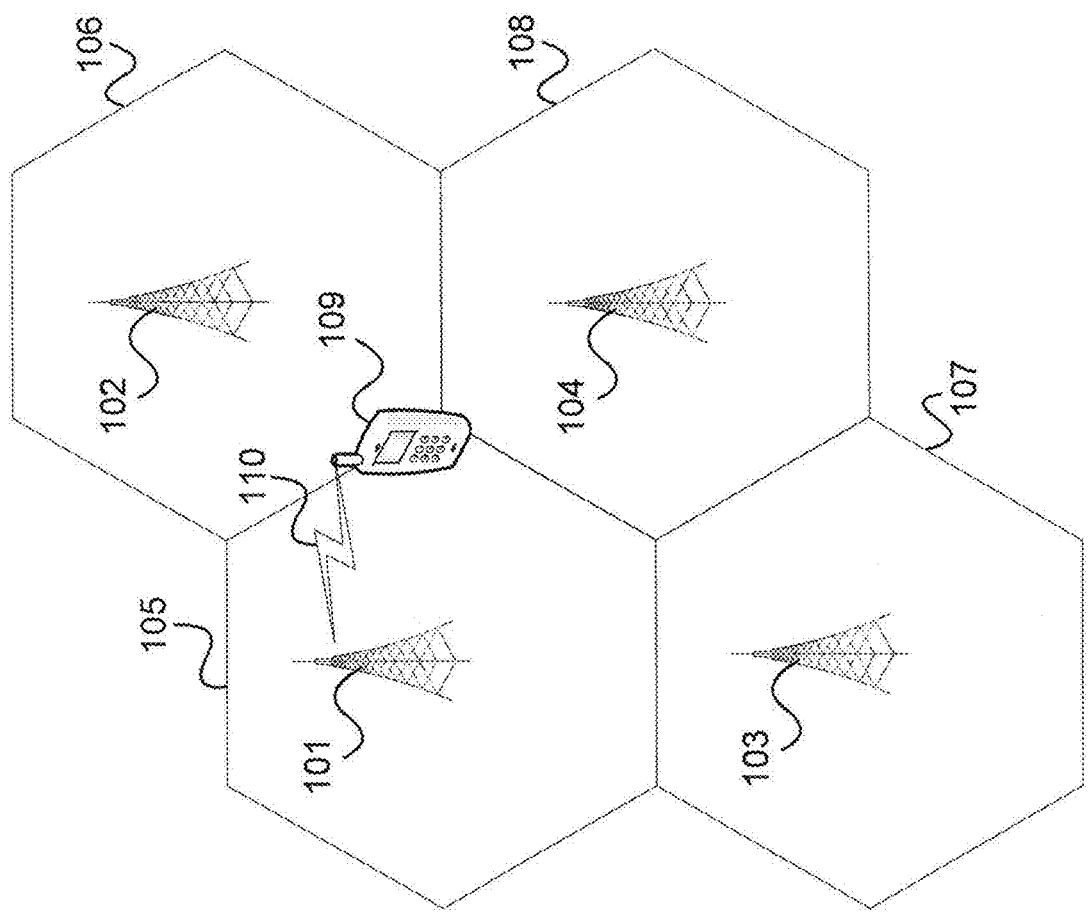
FIG. 1 shows a cellular communication system.

FIG. 1 shows a cellular communication system 100.

The cellular communication system includes a radio access network including a plurality of base stations 101-104, wherein each base station 101-104 operates a radio cell 105-108. A communication terminal (i.e. a subscriber terminal) 109 located in one of the radio cells, in this example a first radio cell 105 operated by a first base station 101, may communicate via a radio communication connection 110 with the first base station 101 to exchange data with the radio access network and for getting access to other networks connected to the radio access network, e.g. a core network of the cellular communication system 100 or the Internet.

There are multiple generations of cellular communication systems, such as 2G such as GSM (Global System for Mobile Communications), 3G such as UMTS (Universal Mobile Telecommunications System) and 4G such as LTE (Long Term Evolution). For fifth generation, 5G, there are concepts considering significant data throughput improvements by the use of millimeter wave spectrum and large bandwidth carriers. The millimeter wave radio resource may be shared between backhaul, front haul and access links. The millimeter wave technology is intended for spectrum with an absolute radio frequency so high that the spectrum range is well suited to offer very large bandwidths. However, the targeted frequency ranges have difficult propagation conditions, mainly caused by the higher absolute radio frequency and the increased propagation loss, on top we have an atmospheric impact.

Specifically, the increasing demand for multi-gigabit throughput in Personal Area Networks (PANs), together with the advancements in mm-wave silicon circuit technologies make 60 GHz communication a desirable approach, given availability of 7 GHz of license free spectrum at these frequencies. Strong attenuation of mm-wave signals actually supports the opportunity of high density multi-user networks, but introduces a challenge of device connectivity over the ranges of 10 m. The latter may be overcome by using directional transmission, thus making the beam-forming (BF) approach one of the typical key features of such a system.

Figure 2:
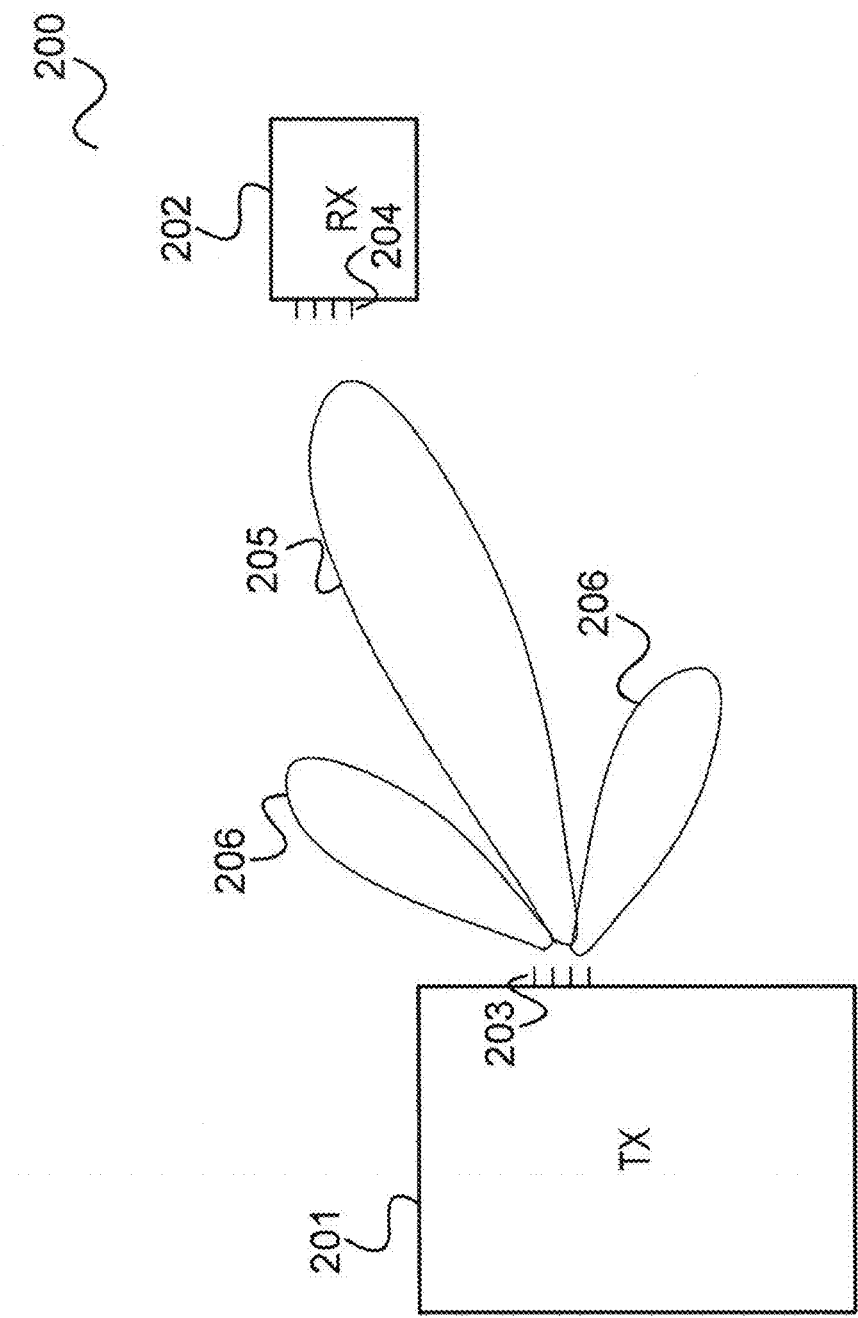
FIG. 2 shows a communication arrangement illustrating beamforming.

Beamforming is illustrated in FIG. 2.

FIG. 2 shows a communication arrangement 200.

The communication arrangement 200 includes a transmitter 201 (e.g. corresponding to one of the first base station 101 and the communication terminal 109) and a receiver 202 (e.g. corresponding to the other of the first base station 101 and the communication terminal 109).

The transmitter 201 includes a directional transmit antenna 203 formed of a plurality of antennas (exciter elements) and the receiver 202 includes a directional receive antenna 204 formed of a plurality of antennas (exciter elements). By setting a phase shift between the antennas forming transmit antenna 203, the transmitter 201 may perform beam forming for a transmit signal such that the antenna gain strongly depends on the angle under which the transmitter is seen (in other words the signal strength depends on the angle of departure from the transmitter 201). In this example, the gain is very high for the direction of a main lobe 205 (as represented by its size), medium for the direction of side lobes 206 and very small for all other directions. Similarly, the receiver 202 may, by setting a phase shift between the antennas forming the receive antenna 204, perform beam forming to make the receive antenna gain dependent from the angle of arrival of a signal.

By beam forming, high antenna gains can be achieved for certain directions. These high antenna gains allow compensating the additional path loss for millimeter waves but require that, in the example of a direct path (i.e. without reflections) as illustrated in FIG. 2, the transmitter (TX) angle of departure (AoD) of the main lobe 205 is perfectly matching the desired receiver (Rx) angle of arrival (AoA), i.e. the angle of arrival for which the receive antenna gain is high. In case of an indirect path, i.e. via a reflection at a certain object, the transmitter (TX) angle of departure (AoD) of the main lobe 205 is to match the direction of the object from the transmitter 201 and the desired receiver (Rx) angle of arrival (AoA) is to match the direction from the object to the receiver 202.

To maximize the possible distance between the transmitter 201 and the receiver 202 both have directional antennas 203, 204. For the application to a cellular communication system, this implies that both the base stations 101-104 as well as the subscriber terminals have directional steerable millimeter wave antennas.

A high gain antenna, such as the transmit antenna 203 and the receive antenna 204 are typically composed of an array of exciter elements and by phase shifting devices and adjustment means for the phase shifts between the exciter elements. The beam (e.g. main lobe 205) can be steered over a certain (angular) range, without mechanical work (by phase shifting). Similarly, the reception pattern of the antenna 204 can be set. This is illustrated in FIG. 3.

Figure 3:
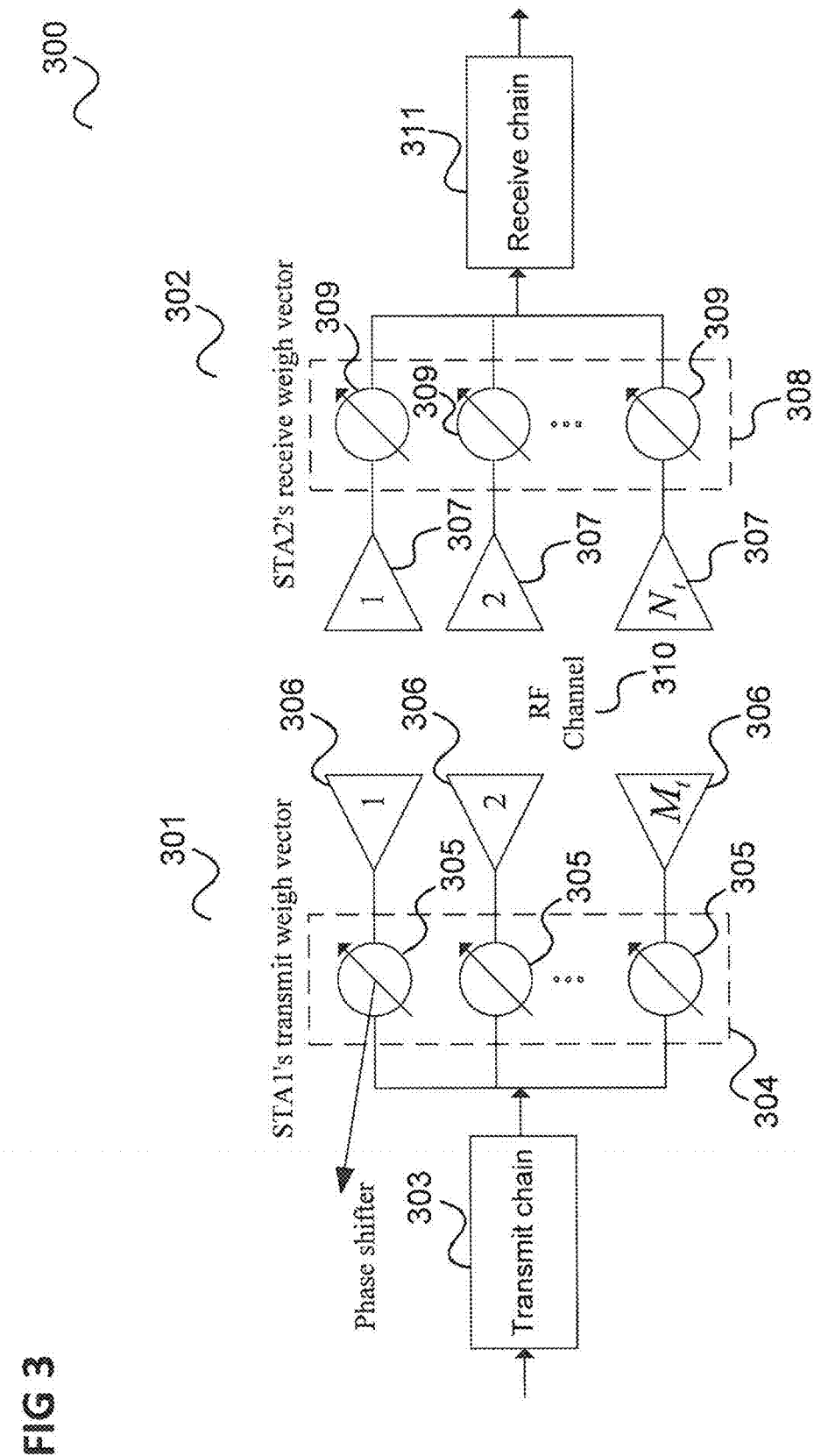
FIG. 3 shows a communication arrangement illustrating the usage of antenna weight vectors for beamforming.

FIG. 3 shows a communication arrangement 300.

The communication arrangement 300 comprises a transmitter 301, e.g. corresponding to transmitter 201, and a receiver 302, e.g. corresponding to receiver 202.

The transmitter 301 comprises a transmit chain 303 via which data to be transmitted are supplied to a transmitter phase shifter array 304. The phase shifter array 304 comprises a phase shifter 305 for each transmit antenna 306 of the transmitter 301. Each phase shifter 305 receives a signal corresponding to the data to be transmitted from the transmit chain 303, shifts its phase according to a respective component of a transmit antenna weight vector (AWV) and supplies the phase-shifted signal to the respective transmit antenna 306. Accordingly, by setting a certain transmit antenna weight vector, a certain radiation pattern, e.g. a certain direction of the main beam of the (overall) antenna formed by the transmit antennas 306 can be set.

Analogously, the receiver comprises receive antennas 307 and a receiver phase shifter array 308 comprising a receiver phase shifter 309 for each receive antenna 307. Each receive antenna 307 receives the (overall) signal transmitted by the transmit antennas via the RF channel 310. The receive phase shifters 309 shift the received signals in accordance with a receive antenna weight vector and the results are combined and fed to a receive chain 311.

In the following, approaches to determine the antenna weight vectors, i.e. the transmit weight vector and the receive weight vector, are described which are related to the beam refinement protocol (BRP) of the WiGig (Wireless Gigabit) specification. In the legacy algorithm according to the WiGig specification, a best Tx (transmission) sector is chosen during an initial Sector Sweep stage; then this sector is used in Tx for the transmission of a BRP packet when an Rx training is performed by switching receiver phase shifter array phases during an BRP extension of the BRP packet. This stage is called BRP-Rx. After BRP-Rx, the receiver AWV is obtained and it is used in Rx for the reception of a BRP packet while transmitter training is performed by switching the phases during BRP extension of the BRP packet (BRP-Tx). In the legacy algorithm, the channel measurements for both BRP-Rx and BRP-Tx are performed for a single time tap (which should represent the path delay of the strongest reflection, but as explained below this may not be the strongest reflection because of system limitations.) The BRP-Rx and BRP-Tx stages can be repeated in iterative manner if contribution of a number of different reflections to the same timing tap is suspected.

In the legacy approach as described above, the following issues may lead to suboptimal antenna weight vector (AWV) selections:

1) The initial sector selection is to be performed with an omnidirectional antenna on the receiver side (i.e. for a configuration of the receiver phase shifters resulting in an omnidirectional pattern of the resulting receive antenna). However, implementation issues may cause the angular response of the omnidirectional antenna to be different from angular responses of the antenna elements which may cause wrong (i.e. suboptiomal) sector selection. This means that a sector associated with a weaker transmission path (e.g. a weaker reflection) is chosen instead of the best sector which is associated with the strongest transmission path (e.g. the strongest reflection) seen by the receiver.

2) The initial Tx AWV is obtained from a Sector Sweep procedure, which sweeps space by a pre-designed sector codebook, i.e. transmits signals into a main beam direction (direction of the main lobe) for each sector of a plurality of sectors given by the sector codebook. If the number of sectors is relatively small, the choice of the best sector during Sector Sweep stage may be misleading. This may happen when the direction of a weaker reflection (i.e. a weakly reflecting object) coincides with a sector pattern maximum (i.e. the main transmission direction for the sector), while a stronger reflection (i.e. a strongly reflecting object) is screened by not being in a sector pattern maximum. This is illustrated in FIG. 4.

Figure 4:
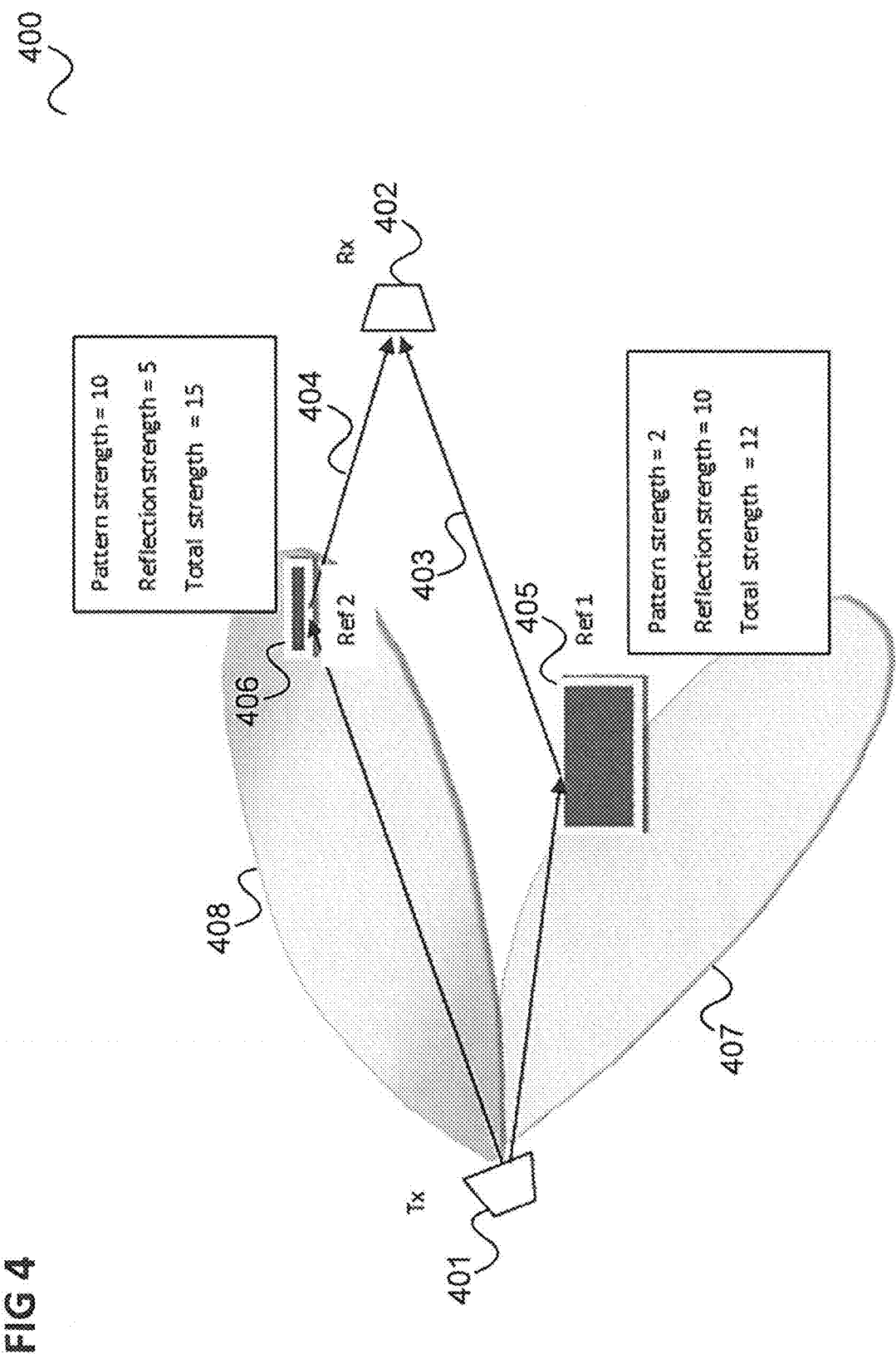
FIG. 4 shows a communication arrangement.

FIG. 4 shows a communication arrangement 400.

Similarly to FIG. 3, the communication arrangement 400 comprises a transmitter 401 and a receiver 402. In this example, there are a first transmission path 403 and a second transmission path 404, neither of which corresponds to the direct transmission path, but which lead via a first reflector 405 (first reflecting object) and a second reflector 406 (second reflecting object), respectively.

However, while the first reflector 405 is much stronger than the second reflector 406, the overall strength of the second transmission path 404 is higher than the overall strength of the first transmission path 403 (e.g. in terms of the reception field strength at the receiver 402. This is because the first reflector 405 lies at the edge of the main lobe 407 of the radiation pattern for a first sector while the second reflector 406 lies in the center of the main lobe 408 of the radiation pattern for a second sector. Thus, the second sector may be selected over the first sector since it seems that it contains the stronger reflector while in fact, the first sector contains the stronger reflector.

In the following, three approaches are described which may be used by a communication system comprising a transmitter (Tx) and a receiver (Rx), e.g. as illustrated in FIG. 3 to determine the transmit antenna weight vector and the receive antenna weight vector.

The first approach is called Full BRP (F-BRP). In this approach a number of candidate strongest sectors are evaluated during the initial sector sweep stage, and legacy BPR-Rx/BRP-Tx algorithms are applied for each candidate sector, i.e. separate BRP-Rx packet and separate BRP-Tx packet are used with each candidate sector. At the end of the process all the significant reflections of the system are known.

The stages of the first approach are summarized in the table 1:

TABLE 1

| Stage Number | Packet Type | Description |
|---|---|---|
| 1 | Tx Sector Sweep | Tx transmits packets for each sector from sector codebook; Rx receives packets with omni antenna and estimates a certain metric for each sector (i.e. a reception quality such as e.g. channel peak). |
| 2 | Feedback | Rx sends to Tx as a feedback the ids (identification) of the M sectors associated with candidate strongest reflections (in terms of reflection quality). |
| 3 | BRP-Rx for sector 1 from the list | Legacy BRP-Rx. The delay of the candidate reflection is estimated using the channel estimation obtained with omni chain. Each sector is associated with significant reflection; some sectors may be associated with the same reflection and it will be evident in the end of the process. |
| 4 | BRP-Rx for sector 2 from the list | Legacy BRP-Rx. The delay of the candidate reflection is estimated using the channel estimation obtained with omni chain (i.e. omni-directional reception). |
| ... | | |
| M + 2 | BRP-Rx for sector M from the list | Legacy BRP-Rx. The delay of the candidate reflection is estimated using the channel estimation obtained with omni chain. |
| M + 3 | BRP-Tx for reflection 1 | Legacy BRP-Tx. The Rx AWV associated with the relevant reflection is used. The delay of the candidate reflection is estimated using the channel estimation obtained with the relevant Rx AWV. |
| M + 4 | Feedback | Legacy BRP-Tx feedback. |
| M + 5 | BRP-Tx for reflection 2 | Legacy BRP-Tx. The Rx AWV associated with the relevant reflection is used. The delay of the candidate reflection is estimated using the channel estimation obtained with the relevant Rx AWV. |
| M + 6 | Feedback | Legacy BRP-Tx feedback. |
| ... | | |
| 3M + 1 | BRP-Tx for reflection M | Legacy BRP-Tx. The Rx AWV associated with the relevant reflection is used. The delay of the candidate reflection is estimated using the channel estimation obtained with the relevant Rx AWV. |
| 3M + 2 | Feedback | Legacy BRP-Tx feedback. |
| Processing: | | Rx sends to Tx the BRP-Tx measurements from which Tx calculates the steering vector and relative strength of each reflection. Since the BRP-Tx for each candidate reflection was performed with Rx steering vector suitable for each reflection, in the end of the process the Tx steering vector of each candidate reflection and the actual reflection strength are obtained. |

The Full BRP scheme according to the first approach may be implemented without any additional hardware support compared to a system that supports legacy BRP and may thus be performed in devices which support legacy BRP. It also allows estimation of unlimited number of significant reflections. However, this scheme is rather wasteful since each candidate reflection (corresponding to a candidate sector) requires sending a separate BRP-Rx packet and a separate BRP-Tx packet.

It should be noted that Full BRP may be further expanded by allowing selection of a number of potential strongest reflections for a single Tx sector. This expansion does not require any additional changes. For this the same Tx sector is used for a number of BRP-Rx packets.

The second approach is called Time Division BRP (TD BRP). It can be seen to be somewhat similar to the Full BRP flow since each reflection is processed separately. However, in this approach, the BRP packet structure and properties are utilized which results in better utilization of system resources. In TD BRP a single BRP-Rx packet is used and a separate processing of each candidate reflection is obtained by dividing the BRP extension of the BRP-Rx packet to different parts. During each part a single reflection is processed by switching the relevant AWVs on the Tx (transmitter) and the Rx (receiver) side. It can be seen that in this approach the number of candidate significant reflections is limited by the maximum size of the BRP extension, which is for example (as it is currently the case) limited to 64 training fields. Specifically it allows estimating 4 significant reflections for case of 16 antenna elements, 5 significant reflections for 12 antenna elements and 8 significant reflections for 8 antenna elements. This may be satisfactory for many practical purposes.

The number of candidate significant reflections may be further increased by using different partitions of the BRP extension; in certain implementations each of the two golay sequences may be associated with a certain AWV during the phase switching process; thus it is possible to support up-to 20 significant reflection for 16 antennas. The drawback of such implementation may be reduced stability vs noise, since smaller number of section is used for each AWV processing.

The stages of the second approach are summarized in the table 2:

TABLE 2

| Stage Number | Packet Type | Description |
|---|---|---|
| 1 | Tx Sector Sweep | Tx transmits packets for each sector from sector codebook; Rx receives packets with omni antenna and estimates certain metric for each sector (e.g. channel peak). |
| 2 | Feedback | Rx sends to Tx as a feedback the ids of the sectors with candidate strongest reflections. |
| 3 | BRP-Rx for sector 1 | BRP-Rx is performed for each sector from 2; Tx uses the best sectors from stage 2 for each reflection; Rx estimates the receiver AWV for all the candidate reflections (using single-tap algorithm). Single BRP-Rx packet is used, while the Tx switches the sectors during the BRP extension of the packet. The peak location for each Tx sector may be obtained from channel estimation during relevant CE section of the BRP extension. (see FIG. 5) |
| 4 | BRP-Rx for sector 2 | |
| ... | | |
| 5 | BRP-Rx for sector M | |
| 6 | BRP-Tx for reflection 1 | BRP-Tx is performed for each candidate reflection; Tx transmits Hadamard sequences, Rx receives with AWVs obtained in 3-5 for each candidate reflection. Single BRP-Tx packet is used, and Rx switches the receiving AWVs in the middle. (see FIG. 5) |
| 7 | BRP-Tx for reflection 2 | |
| ... | | |
| 8 | BRP-Tx for reflection M | |
| 9 | Feedback | Rx sends to Tx the BRP-Tx measurements from which Tx calculates the steering vector and relative strength of each reflection. Since the BRP-Tx for each candidate reflection was performed with Rx steering vector suitable for each reflection, in the end of the process we obtain the Tx steering vector of each candidate reflection and the actual reflection strength. |

Figure 5:
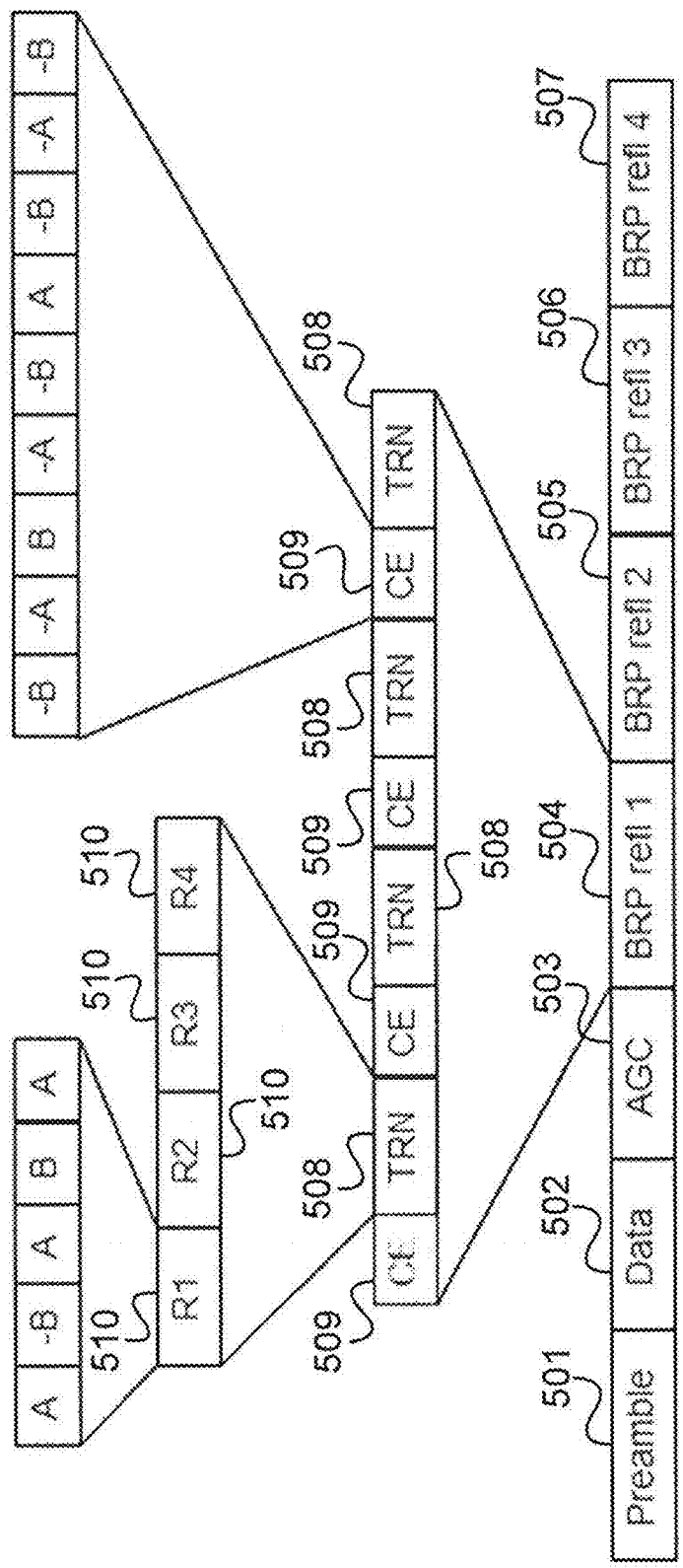
FIG. 5 shows an example of a structure of a beam refinement procedure packet.

FIG. 5 shows an example of a structure of a beam refinement procedure packet (also referred to as beam training procedure packet), in this example a TD BRP-Rx (or TD BRP-Tx) packet 500 for N=16 antennas and M=4 strongest reflections.

The BRP packet 500 comprises a preamble 501, data 502, AGC (Automatic Gain Control) information 503 and an BRP extension which is in this example divided into four parts 504, 505, 506, 507 wherein in each part (i.e. during the transmission of each part) the regular BRP-Rx (or BRP-Tx) for a respective candidate strongest reflection is performed (in this example for four reflections refl 1 to refl 4).

Each part comprises training fields 508 each being preceded and followed by a channel estimation field 509, wherein the first channel estimation field for the part (i.e. the leftmost channel estimation field 509 in FIG. 5) is used for delay training of the respective candidate strongest reflection, i.e. for determining the delay of the candidate strongest reflection.

Each training field 508 comprises a field 510 for each Rx (or Tx) AWV that is being tested (e.g. given by a respective column of a Hadamard matrix), in other words, for each space direction that is being sampled and each field 510 comprises a sequence of complementary golay sequences A and B of order 7.

It should be noted that the partition of the packet 500 is only an example and other partitions of the BRP extension can be performed.

TD BRP according to the second approach is less wasteful than Full BRP according to the first approach. It still takes more time than the legacy BRP approach, since it requires using different TRN (training) fields for different reflections. Thus, the number of significant reflections that can be estimated is limited. However, the TD BRP may be repeated for a number of times for all significant reflections of interest.

The third approach is called Space Division BRP (SD-BRP). SD-BRP can be seen to be based on the fact that the reflection strength of a reflection may not only be estimated when the optimal receiving AWV suitable for the reflection is used (which produces an overlapping coefficient c=1 with the reflection), but can be estimated for any receiving AWV with known overlapping coefficient with given reflection. Moreover, since many practical cases are not SNR (signal-to-noise ratio) limited, both Tx and Rx steering vectors (i.e. AWVs) may be created which point simultaneously to a number of significant reflections. This decreases the SNR for processing of each individual reflection but, as mentioned, can be expected to be acceptable in many practical cases. SD-BRP uses single BRP-Rx and single BRP-Tx packets with the same length of BRP extension as the legacy BRP algorithm.

The first stage of selecting a number of strongest sectors remains the same as in the other approaches. Then for the transmission of BRP-Rx packet a steering vector is used which is a combination of all the selected sectors. An example for how such steering vector can be obtained is given further below. For the BRP-Rx packet it is not important to know the exact overlapping coefficients of the combined steering vector with each reflection; it is sufficient to obtain non-zero overlapping coefficients. In Rx, multi-tap BRP is performed. This means applying a legacy BRP for each tap that is associated with a significant reflection. The multiple taps are obtained with omni channel estimation as in legacy BRP.

After this stage the receiver knows the steering Rx vectors of all the significant reflections. From these steering vectors the receiver calculates the combined Rx steering vector, which has non-zero and known overlapping coefficients with all the significant reflections. Here it is critical not only to get non-zero overlapping coefficients, but also to know it exactly for each significant reflection. At the next stage the BRP-Tx is performed, using the same packet as in legacy BRP, while the receiver uses the combined steering vector with known overlapping coefficients with each significant reflection. After performing multi-tap BRP, the Tx steering vectors can be calculated, and relative strengths of all the significant reflections are obtained.

The stages of the second approach are summarized in the table 3:

TABLE 3

| Stage Number | Packet Type | Description |
| --- | --- | --- |
| 1 | Tx Sector Sweep | Tx transmits packets for each sector from sector codebook; Rx receives packets with omni antenna and estimates certain metric for each sector (e.g. channel peak). |
| 2 | Feedback | Rx sends to Tx as a feedback the ids of the sectors with candidates for strongest reflections. |
| 3 | BRP-Rx | Tx uses the combined sector which is a combination of sectors obtained in 2; Rx estimates the receiver AWV for each of the candidate reflections (applying legacy BRP method algorithm on each candidate tap) |
| 4 | BRP-Tx for multiple reflections | BRP-Tx is performed; Tx transmits Hadamard sequences, Rx receives with combined AWV obtained as some combination of candidates reflections from stage 3. This combined steering vector has known overlapping coefficients with all the significant reflections. |
| 7 | Feedback | Rx sends to Tx the BRP-Tx measurements from which Tx calculates the steering vector and relative strength of each significant reflection. The combined receiving AWV has a non-zero, known overlap with all the reflection; it is possible to obtain the Tx steering vector of each candidate reflection and the actual reflection strength. |

Once all the significant reflections of the system are obtained according to one of the above approaches (including relative Tx/Rx steering vectors and absolute reflections strengths), the transmitter 301, the receiver 302 or both may apply some optimization procedure to provide an optimal channel in the sense of strongest peak, largest SNR or largest PPSNR (post-processing SNR). For example, choosing the steering vectors associated with the strongest reflection will provide a channel with strongest single peak.

The transmitter 301 and the receiver 302 may use one or more reflections which are not the strongest reflections as secondary link options which may for example be used when the main link (i.e. the strongest reflection) gets blocked.

To give an example of the SD-BRP flow (i.e. the third approach as described above) for the case when candidate strong reflections are obtained for different sectors, and parameters obtained after each step, a simple case of a channel consisting of two time and spatially separated reflections is considered. The MIMO channel in this case has a form:

$$\text{Ch}(t) = a_1 U_1 V_1 * d(t-t_1) + a_2 U_2 V_2 * d(t-t_2) \quad (1)$$

with $U_1$, $U_2$, $V_1$, $V_2$ being the Rx and Tx steering vectors associated with the first and second reflections, and $a_1$ and $a_2$ are the actual reflections strengths (reflection may indicate either physical reflection or LOS (i.e. direct) path). t1, t2 represent the reflections delays and d( ) is the Dirac delta function.

Assuming that two sectors from codebook have the maximum overlap with reflections, the SISO channel with Tx transmitting in sector 1 is obtained:

$$\text{ChSISO}_1(t) = a_1 o_1 c_{11} * d(t-t_1) + a_2 o_2 c_{12} * d(t-t_2) \quad (2)$$

where $a_1, a_2$ are the actual strengths of the first and second reflections $o_1, o_2$ are the omni antenna gains for the first and second reflections, $c_{11}$ is the first sector overlap with the first reflection and $c_{12}$ is the first sector overlap with the second reflection. If both overlapping coefficients $c_{11}$ and $c_{12}$ are strong enough, while $c_{21}$ and $c_{22}$ are very small, we will obtain the case where both candidate reflections are obtained in the same sector.

If $c_{12}$ is relatively small, only the first reflection will be visible for the first sector channel estimation. Transmitting in the second sector from the codebook yields similar expression with relevant overlapping coefficients.

$$\text{ChSISO}_2(t)=a_1o_1c_{21}*d(t-t_1)+a_2o_2c_{22}*d(t-t_2) \quad (3)$$

It was mentioned that in ideal system, the omni antenna is isotropic and then o1=o2. In a real system, it may have some spatial pattern, and then one gets o1≠o2. From equations above it can be seen that indeed three factors define the "effective" reflection strength—the "real" reflection strength, the omni gain and the overlap with the sector pattern.

It is assumed that the overlapping coefficients $c_{12}$ and $c_{21}$ are very small, and thus one gets a single candidate reflection for each sector. The receiver sends as a feedback the ids of these sectors to the Tx side. In the next stage BRP-Rx is performed. The transmitter transmits with combined AWV, which is obtained as a combination of the two sectors of interest. The discussion how to calculate the combined AWV is left to a later section. The resulting SIMO channel, obtained with the combined AWV in Tx is given by:

$$\text{Ch}(t)=a_1U_1c_{c1}*d(t-t_1)+a_2U_2c_{c2}*d(t-t_2) \quad (4)$$

The coefficients $c_{c1}$ and $c_{c2}$ are the overlapping coefficients of the combined Tx AWV vector with the first and the second reflections. Since the original $c_{11}$ and $c_{22}$ coefficients are not known in the current stage, the overlapping coefficients $c_{c1}$ and $c_{c2}$ are not known as well, the only important thing here is that they should be strong enough to provide sufficient SNR for BRP-Rx of each reflection. Performing the BRP-Rx stage we may obtain the Rx steering vectors $U_1$ and $U_2$, applying legacy BRP at taps referring to the delays $t_1$ and $t_2$.

Next, the BRP-Tx algorithm is performed, i.e. the Tx side sweeps the Hadamard AWVs, while the Rx side receives with the combined AWV which has known overlapping coefficients $r_1$ and $r_2$ with the first and second reflections. The MISO channel on which the BRP-Tx is applied is given by:

$$\text{Ch}(t)=a_1r_1V_1d(t-t_1)+a_2r_2V_2d(t-t_2) \quad (5)$$

Since the overlapping coefficients $r_1$ and $r_2$ are known, using the legacy BRP approach the Tx steering vectors $V_1$ and $V_2$ and also the relative strengths $a_1$ and $a_2$ of the reflections can be estimated.

In the following, it is shown how to calculate the combined Tx/Rx steering vectors which have known overlapping coefficients with a given set of steering vectors. First, the given set of steering vectors is assumed to consist of two steering vectors and the approach is then expanded to any number of given steering vectors.

It is assumed that the combined steering vector has a form $$U_c=x_1U_1+x_2U_2 \quad (6)$$

where $U_1$ and $U_2$ are given steering vectors. Since $U_c$ itself is steering vector, it should satisfy the normalized power criterion, i.e. $<U_c,U_c>=1$. The overlapping coefficients of $U_c$ with $U_1$ and $U_2$ are given by $<U_c,U_1>=r_{c1}$ and $<U_c,U_2>=r_{c2}$. Additionally, $r_{12}=<U_1,U_2>$.

Expanding these conditions gives the following set of equations:

$$\text{abs}(x_1)^2+2Re\{x_1x_2*r_{12}\}+\text{abs}(x_2)^2=1 \quad (7)$$

$$x_1+x_2\text{conj}(r_{12})=r_{c1} \quad (8)$$

$$x_1r_{12}+x_2=r_{c2} \quad (9)$$

In this form there are three equations with only two variables. There are two options to proceed—the first option is to add a normalization parameter f to equations (8) and (9), i.e. rewrite them in the form:

$$x_1+x_2\text{conj}(r_{12})=r_{c1}f \quad (10)$$

$$x_1r_{12}+x_2=r_{c2}f \quad (11)$$

Now the system has an analytical solution, but the formulas are very cumbersome and are not easy to implement. An alternative way is to solve the simple system of equations (8) and (9) and get relatively simple analytical solutions:

$$x_1=(r_{c1}-r_{c2}*\text{conj}(r_{12}))/(1-\text{abs}(r_{12})^2) \quad (12)$$

$$x_2=(r_{c2}-r_{c1}*r_{12})/(1-\text{abs}(r_{12})^2) \quad (13)$$

The formulas above may be further simplified for given values of desired $r_{c1}$ $r_{c2}$ coefficients, for example $r_{c1}=r_{c2}=\frac{1}{2}$. Then the normalization constant should be obtained by substituting (12) and (13) into (7). Then $x_1$, $x_2$ should be normalized to satisfy unity power condition. It should be noted that the final values of the overlapping coefficients will not be $r_{c1}$, $r_{c2}$, but $r_{c1}f$, $r_{c2}f$, with f being a normalization factor to satisfy unity power condition.

In the same way a combined steering vector may be calculated to provide known overlapping coefficients with three and more reflections.

In the case where only phase modulation is allowed, the obtained combined AWV may be first calculated following the above, and then only its phase is taken and quantized. It can be expected that this procedure will introduce an acceptable level of noise to the system.

To give an example of the F-BRP algorithm flow (Full-BRP according to the first approach) for the case when candidate strong reflections are obtained for different sectors, and parameters obtained after each step, a simple case of a channel consisting of two time and spatially separated reflections is considered in the following. The MIMO channel in this case has a form:

$$\text{Ch}(t)=a_1U_1V_1*d(t-t_1)+a_2U_2V_2*d(t-t_2) \quad (14)$$

with $U_1$, $U_2$, $V_1$, $V_2$ being the Rx and Tx steering vectors associated with the first and second reflections, and $a_1$ and $a_2$ are the actual reflections strengths (reflection may indicate either physical reflection or LOS path). t1, t2 represent the reflections delays and d( ) is the Dirac delta function.

Assuming that two sectors from codebook have the maximum overlap with reflections, the SISO channel with Tx transmitting in sector 1 is obtained:

$$\text{ChSISO}_1(t)=a_1o_1c_{11}*d(t-t_1)+a_2o_2c_{12}*d(t-t_2) \quad (15)$$

where $a_1,a_2$ are the actual strengths of the first and second reflections, $o_1,o_2$ are the omni antenna gains for the first and second reflections, $c_{11}$ is the first sector overlap with the first reflection and $c_{12}$ is the first sector overlap with the second reflection. If both overlapping coefficients $c_{11}$ and $c_{12}$ are strong enough, while $c_{21}$ and $c_{22}$ are very small, one obtains the case where both candidate reflections are obtained in the same sector. If $c_{12}$ is relatively small, only the first reflection will be visible for the first sector channel estimation.

Transmitting the second sector from the codebook yields similar expression with relevant overlapping coefficients.

$$\text{ChSISO}_2(t) = a_1 o_1 c_{21} * d(t-t_1) + a_2 o_2 c_{22} * d(t-t_2) \quad (16)$$

It was mentioned that in ideal system, the omni antenna is isotropic and then o1=o2. In real system, it may have some spatial pattern, and then one gets $o_1 \neq o_2$. From equations above it can be seen that indeed three factors define the "effective" reflection strength—the "real" reflection strength, the omni gain and the overlap with the sector pattern.

Assuming that the overlapping coefficients $c_{12}$ and $c_{21}$ are very small there is a single candidate reflection for each sector. The receiver sends as a feedback the ids of these sectors to the Tx side. In the next stage the BRP-Rx is performed. The transmitter firstly transmits in the first sector. The resulting SIMO channel, obtained with the combined AWV in Tx is given by:

$$\text{Ch}(t) = a_1 U_1 c_{11} * d(t-t_1) + a_2 U_2 c_{12} * d(t-t_2) \approx a_1 U_1 c_{11} * d(t-t_1) \quad (17)$$

Performing the BRP-Rx stage the Rx steering vector $U_1$ may be obtained. In the same manner by transmitting the second sector from Tx and performing BRP-Rx on the second reflection the steering vector $U_2$ may be obtained. At this stage the reflection strengths $a_1$ and $a_2$ are still not known since the overlapping coefficients $c_{11}$ and $c_{22}$ are not known.

Next, the BRP-Tx algorithm is performed, i.e. the transmitter sweeps the Hadamard AWVs, while the Rx side receives with $U_1$.

The MISO channel on which the BRP-Tx is applied is given by:

$$\text{Ch}(t) = a_1 V_1 d(t-t_1) + a_2 r_2 V_2 d(t-t_2) \approx a_1 V_1 d(t-t_1). \quad (18)$$

Now using the legacy BRP approach the Tx steering vector $V_1$ and also the relative strengths $a_1$ of the first reflection can be estimated. In the similar manner the Tx steering vector $V_2$ and its relevant reflection strength $a_2$ can be obtained.

Figure 6:
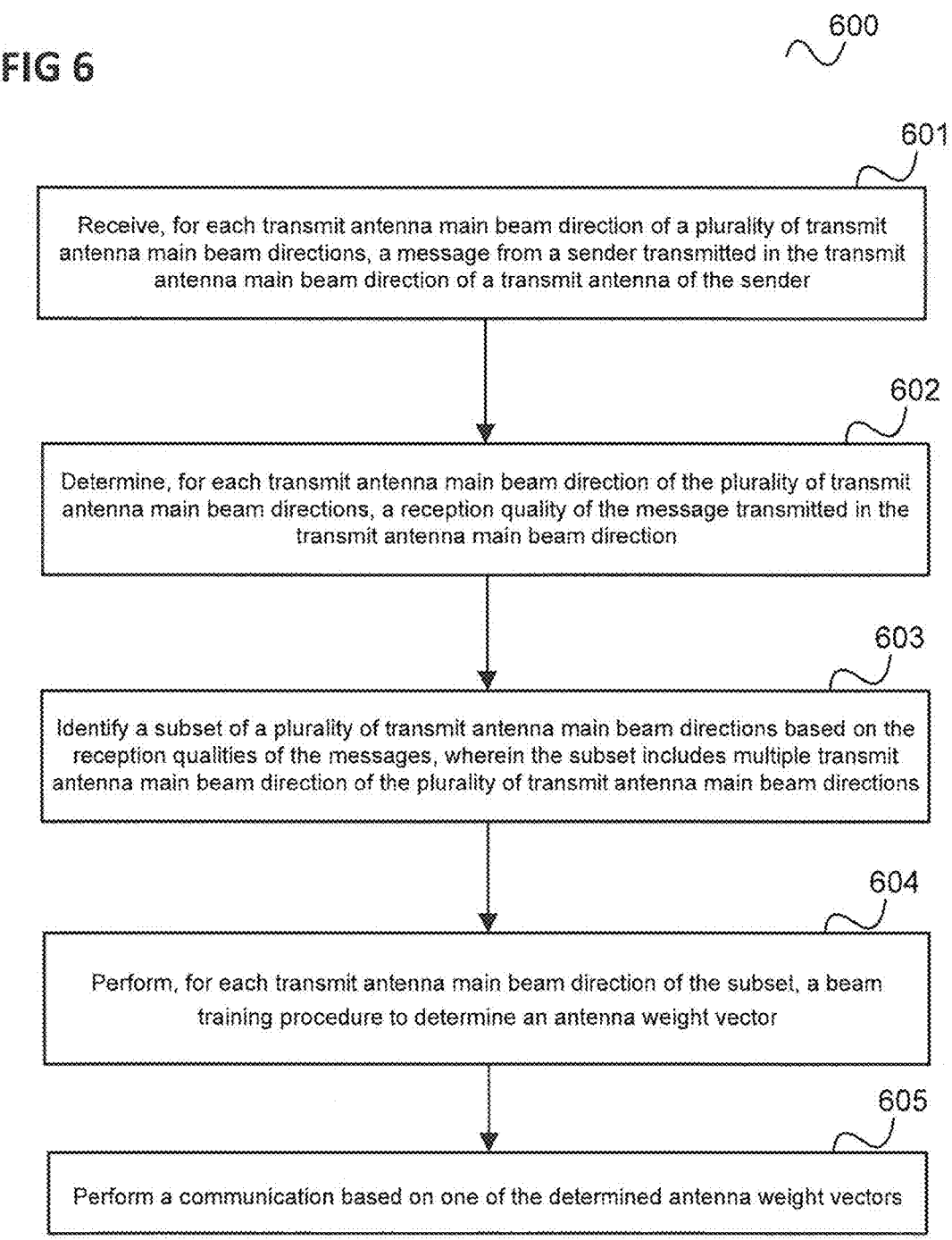
FIG. 6 shows a flow diagram illustrating a method for communication, e.g. performed by receiver.

In summary, according to various examples, a method for communication as illustrated in FIG. 6 is provided, for example carried out by a receiver.

FIG. 6 shows a flow diagram 600 illustrating a method for communication.

In 601, the receiver receives, for each transmit antenna main beam direction of a plurality of transmit antenna main beam directions, a message from a sender transmitted in the transmit antenna main beam direction of a transmit antenna of the sender.

In 602, the receiver determines, for each transmit antenna main beam direction of the plurality of transmit antenna main beam directions, a reception quality of the message transmitted in the transmit antenna main beam direction.

In 603, the receiver identifies a subset of a plurality of transmit antenna main beam directions based on the reception qualities of the messages, wherein the subset includes multiple transmit antenna main beam directions of the plurality of transmit antenna main beam directions;

In 604, the receiver performs, for each transmit antenna main beam direction of the subset, a beam training procedure to determine an antenna weight vector for the transmit antenna main beam direction.

In 605, the receiver performs a communication based on one of the determined antenna weight vectors.

Figure 7:
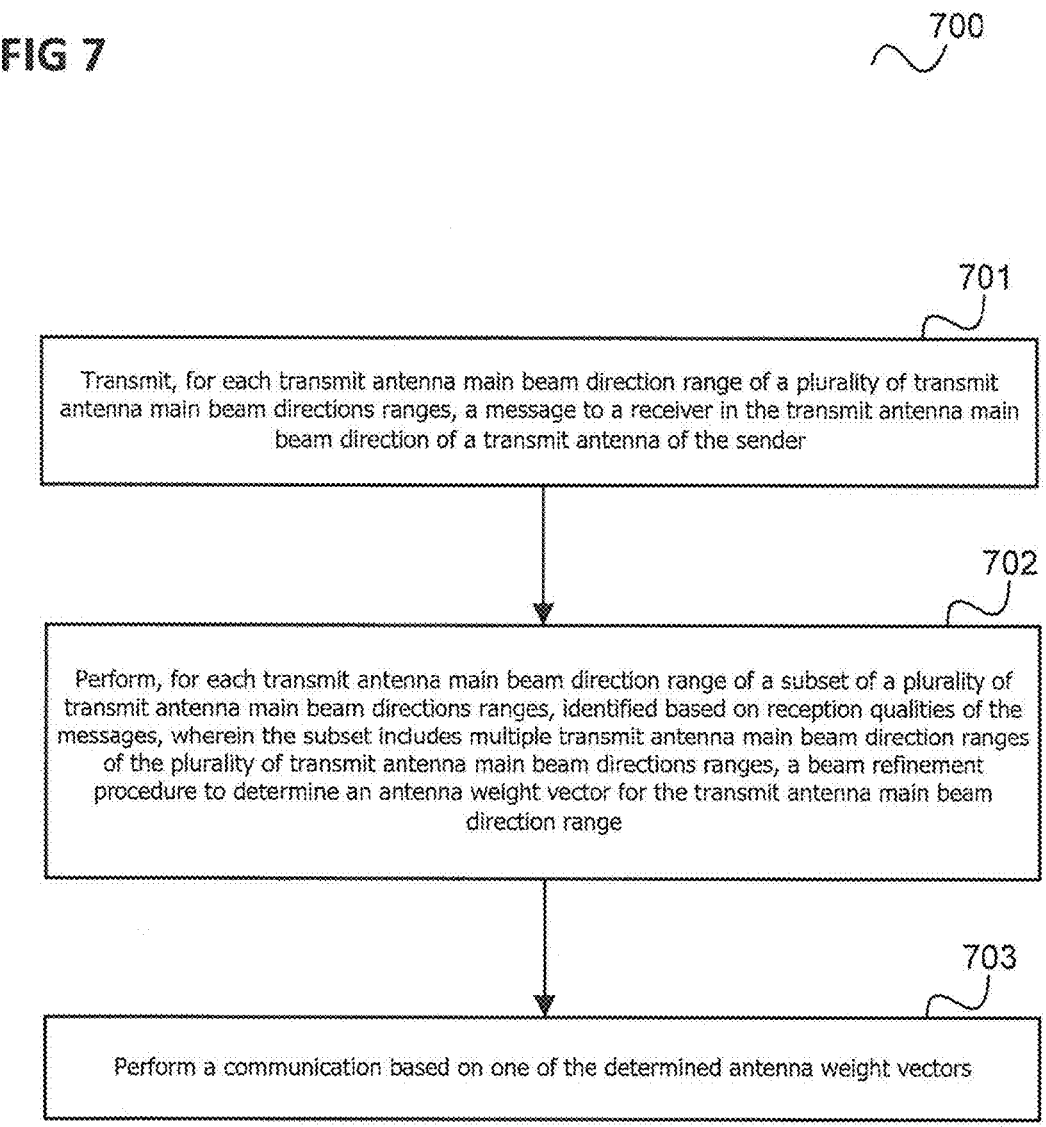
FIG. 7 shows a flow diagram illustrating a method for communication, e.g. performed by a transmitter.

Further, according to various examples, a method for communication as illustrated in FIG. 7 is provided, for example carried out by a transmitter.

FIG. 7 shows a flow diagram 700 illustrating a method for communication.

In 701, the transmitter transmits, for each transmit antenna main beam direction of a plurality of transmit antenna main beam directions, a message to a receiver in the transmit antenna main beam direction of a transmit antenna of the sender.

In 702, the transmitter performs, for each transmit antenna main beam direction of a subset of a plurality of transmit antenna main beam directions, identified based on reception qualities of the messages, wherein the subset includes multiple transmit antenna main beam directions of the plurality of transmit antenna main beam directions, a beam training procedure to determine an antenna weight vector for the transmit antenna main beam direction.

In 703, the transmitter performs a communication based on one of the determined antenna weight vectors.

According to various examples, in other words, a beam training procedure (e.g. a beam refinement procedure such as one of or both of a BRP-Rx and a BRB-Tx procedure) is performed for each of a plurality of sectors (or each of a plurality of candidate reflections), i.e. each transmit antenna main beam direction. An antenna weight vector (for the transmit antenna, the receiver antenna or a combination of both) is determined for each sector (or candidate reflection) and the antenna weight vector to be used for the communication may be selected from among the determined antenna weight vectors. For example, the transmit antenna weight vector or receive antenna weight vector or combination of both which gives the best result (i.e. the best reception quality, e.g. in terms of reception field strength, signal-to-noise ratio etc.) may be selected and one or more others which give the next best results are for example kept as backup in case that the link corresponding to the best fails (e.g. the communication path is obstructed).

The communication methods described with reference to FIGS. 6 and 7 may for example be applied to a mobile communication network but may also be applied to other types of communication networks.

Figure 8:
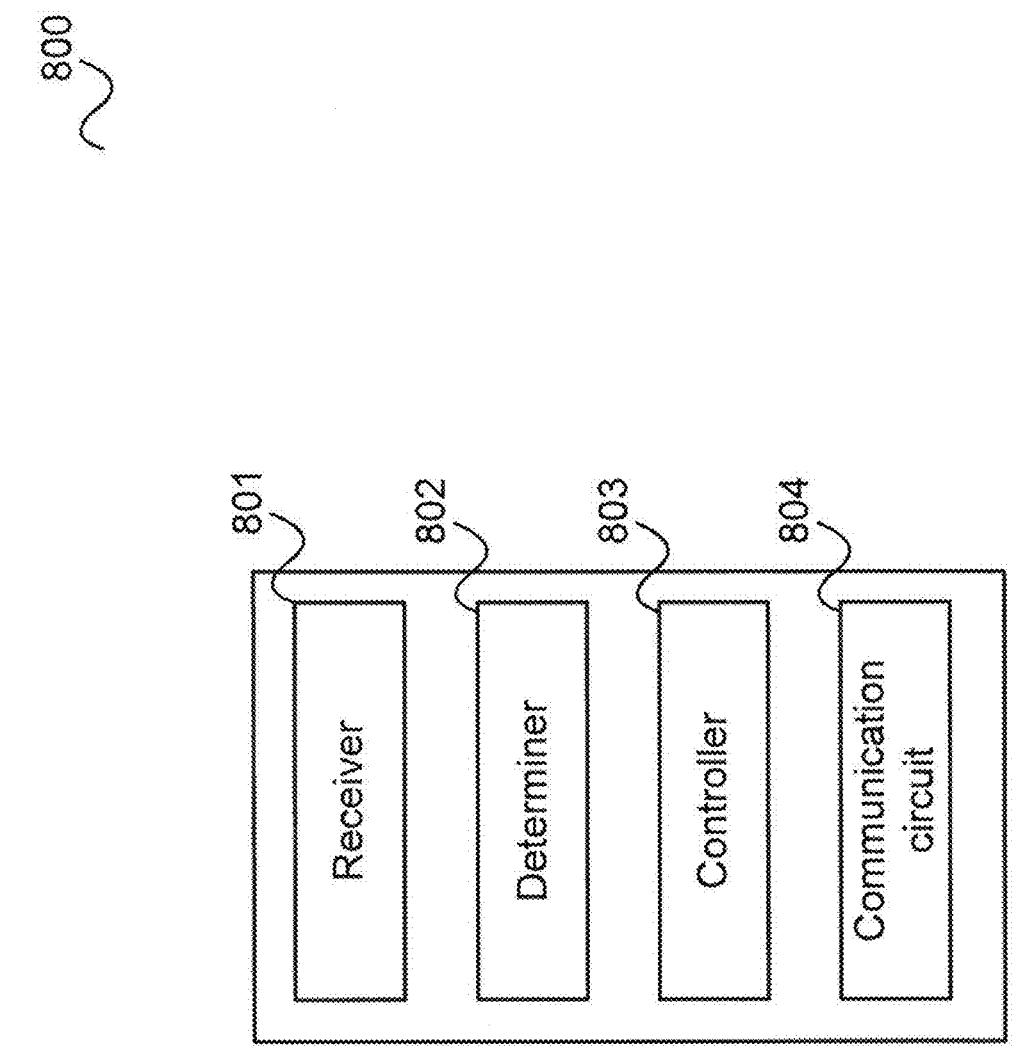
FIG. 8 shows a communication device, for example performing the method of FIG. 6.

The method illustrated in FIG. 6 is for example carried out by a communication device as illustrated in FIG. 8.

FIG. 8 shows a communication device 800.

The communication device 800 comprises a receiver 801 configured to receive, for each transmit antenna main beam direction of a plurality of transmit antenna main beam directions, a message from a sender transmitted in the transmit antenna main beam direction of a transmit antenna of the sender and a determiner 802 configured to determine, for each transmit antenna main beam direction of the plurality of transmit antenna main beam directions, a reception quality of the message transmitted in the transmit antenna main beam direction.

The communication device 800 further comprises a controller 803 configured to identify a subset of a plurality of transmit antenna main beam directions based on the reception qualities of the messages, wherein the subset includes multiple transmit antenna main beam directions of the plurality of transmit antenna main beam directions.

Further, the communication device 800 comprises a communication circuit 804 configured to perform, for each transmit antenna main beam direction of the subset, a beam training procedure to determine an antenna weight vector for the transmit antenna main beam direction and configured to perform a communication based on one of the determined antenna weight vectors.

Figure 9:
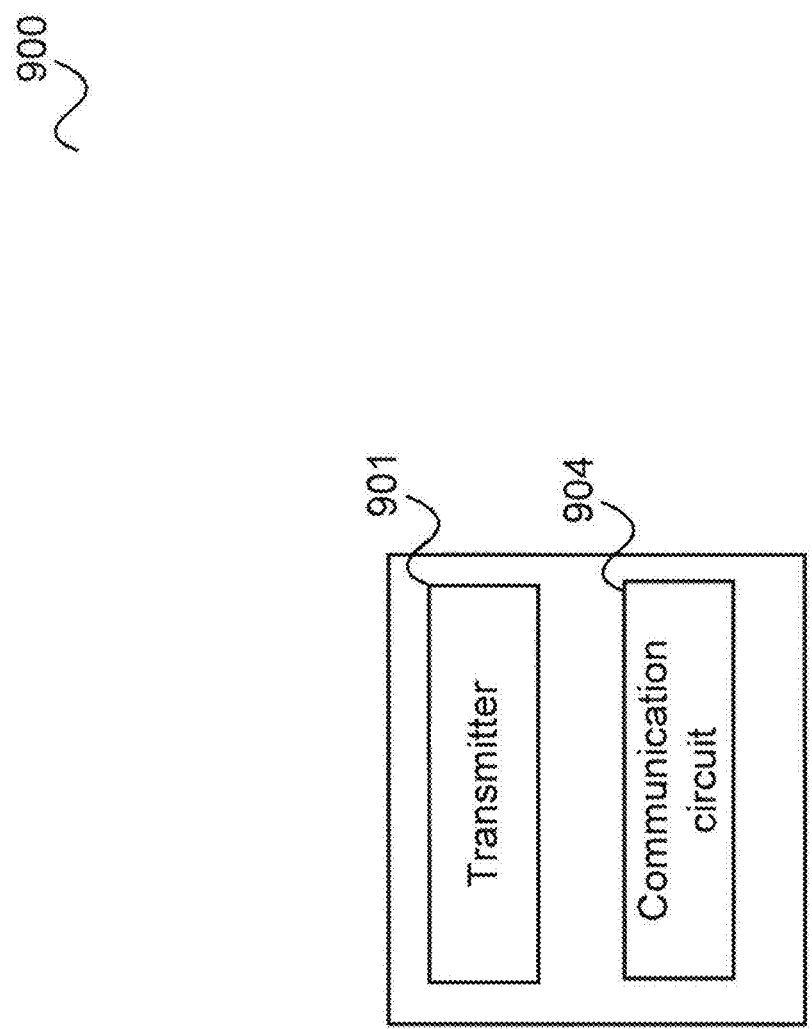
FIG. 9 shows a communication device, for example performing the method of FIG. 7.

The method illustrated in FIG. 7 is for example carried out by a communication device as illustrated in FIG. 9.

FIG. 9 shows a communication device 900.

The communication device 900 comprises a transmitter 901 configured to transmit, for each transmit antenna main beam direction of a plurality of transmit antenna main beam directions, a message to a receiver in the transmit antenna main beam direction of a transmit antenna of the sender.

The communication device 900 further comprises a communication circuit 902 configured to perform, for each transmit antenna main beam direction of a subset of a plurality of transmit antenna main beam directions, identified based on reception qualities of the messages, wherein the subset includes multiple transmit antenna main beam directions of the plurality of transmit antenna main beam directions, a beam training procedure to determine an antenna weight vector for the transmit antenna main beam direction and configured to perform a communication based on one of the determined antenna weight vectors.

The components of the communication devices 800, 900 (e.g. the receiver, the transmitter, the determiner and the communication circuit) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The following examples pertain to further embodiments.

Example 1 is a communication method as illustrated in FIG. 6.

In Example 2, the subject matter of Example 1 may optionally include performing the communication based on a selected one of the determined antenna weight vectors.

In Example 3, the subject matter of any one of Examples 1-2 may optionally include performing, for each transmit antenna main beam direction of the subset, a first beam training procedure to determine an antenna weight vector for a receive antenna of the receiver and performing, for each transmit antenna main beam direction of the subset, a second beam training procedure to determine an antenna weight vector for a transmit antenna of the sender.

In Example 4, the subject matter of any one of Examples 1-3 may optionally include the antenna weight vector being an antenna weight vector for a receive antenna of the receiver.

In Example 5, the subject matter of Example 4 may optionally include the beam training procedure comprising, for each of a plurality of training antenna weight vectors, the reception of a signal transmitted or received using the training antenna weight vector.

In Example 6, the subject matter of any one of Examples 4-5 may optionally include the beam training procedure comprising the reception of a beam training procedure packet.

In Example 7, the subject matter of any one of Examples 4-6 may optionally include the beam training procedure being a receiver beam training procedure.

In Example 8, the subject matter of any one of Examples 4-7 may optionally include the beam training procedure comprising, for each of a plurality of training receive antenna weight vectors, the reception of a signal using the training receive antenna weight vector.

In Example 9, the subject matter of any one of Examples 1-8 may optionally include the antenna weight vector being an antenna weight vector for a transmit antenna of the sender.

In Example 10, the subject matter of Example 9 may optionally include the beam training procedure being a transmitter beam training procedure.

In Example 11, the subject matter of any one of Examples 9-10 may optionally include the beam training procedure comprising, for each of a plurality of training transmit antenna weight vectors, the reception of a signal transmitted using the training transmit antenna weight vector.

In Example 12, the subject matter of Example 11 may optionally include signaling, for each transmit antenna main beam direction, a result of the transmitter beam training procedure to the sender.

In Example 13, the subject matter of Example 12 may optionally include the result comprising an indication of a reception qualities of training signals sent for different transmit antenna weight vectors.

In Example 14, the subject matter of any one of Examples 1-13 may optionally include determining, for each transmit antenna main beam direction, an antenna weight vector for the transmit antenna main beam direction and selecting an antenna weight vector for the receive antenna of the receiver from the determined antenna weight vectors.

In Example 15, the subject matter of any one of Examples 1-14 may optionally include performing the beam training procedure for multiple transmit antenna main beam directions of the subset by receiving a beam training procedure packet shared between the multiple transmit antenna main beam direction.

In Example 16, the subject matter of Example 15 may optionally include the beam training procedure packet comprising training signals for each transmit antenna main beam direction of the multiple transmit antenna main beam direction.

In Example 17, the subject matter of any one of Examples 1-16 may optionally include performing the beam training procedure comprising receiving a training signal transmitted using a combination of a multiple of transmit antenna main beam direction of the subset.

In Example 18, the subject matter of Example 17 may optionally include performing the beam training procedure comprising processing the training signal using multiple taps, wherein each tap corresponds to a transmit antenna main beam direction of the multiple of transmit antenna main beam direction of the subset.

In Example 19, the subject matter of Example 18 may optionally include each transmit antenna main beam direction corresponding to at least one tap of the multiple taps.

In Example 20, the subject matter of any one of Examples 1-19 may optionally include performing the communication based on one of the determined antenna weight vectors and storing at least one other of the determined antenna weight vectors as backup in case a communication path corresponding to the antenna weight vector based on which communication being performed being obstructed.

Example 21 is a communication method as illustrated in FIG. 7.

In Example 22, the subject matter of Example 21 may optionally include performing the communication based on a selected one of the determined antenna weight vectors.

In Example 23, the subject matter of any one of Examples 21-" " may optionally include performing, for each transmit antenna main beam direction of the subset, a first beam training procedure to determine an antenna weight vector for a receive antenna of the receiver and comprising performing, for each transmit antenna main beam direction of the subset, a second beam training procedure to determine an antenna weight vector for a transmit antenna of the sender.

In Example 24, the subject matter of any one of Examples 21-"§ may optionally include the antenna weight vector being an antenna weight vector for a transmission antenna of the sender.

In Example 25, the subject matter of Example 24 may optionally include the beam training procedure comprising, for each of a plurality of training antenna weight vectors, the transmission of a signal transmitted or received using the training antenna weight vector.

In Example 26, the subject matter of any one of Examples 24-25 may optionally include the beam training procedure comprising the transmission of a beam training procedure packet.

In Example 27, the subject matter of any one of Examples 24-26 may optionally include the beam training procedure being a transmitter beam training procedure.

In Example 28, the subject matter of any one of Examples 24-27 may optionally include the beam training procedure comprising, for each of a plurality of training receive antenna weight vectors, the transmission of a signal using the training receive antenna weight vector.

In Example 29, the subject matter of any one of Examples 21-28 may optionally include the antenna weight vector being an antenna weight vector for a receive antenna of the receiver.

In Example 30, the subject matter of Example 29 may optionally include the beam training procedure being a receiver beam training procedure.

In Example 31, the subject matter of any one of Examples 29-30 may optionally include the beam training procedure comprising, for each of a plurality of training receive antenna weight vectors, the transmission of a signal received using the training receive antenna weight vector.

In Example 32, the subject matter of Example 31 may optionally include receiving, for each transmit antenna main beam direction, a result of the transmitter beam training procedure from the receiver.

In Example 33, the subject matter of Example 32 may optionally include the result comprising an indication of a reception qualities of training signals sent for different transmit antenna weight vectors.

In Example 34, the subject matter of any one of Examples 21-33 may optionally include determining, for each transmit antenna main beam direction, an antenna weight vector for the transmit antenna main beam direction and selecting an antenna weight vector for the transmit antenna of the sender from the determined antenna weight vectors.

In Example 35, the subject matter of any one of Examples 21-34 may optionally include performing the beam training procedure for multiple transmit antenna main beam directions of the subset by transmitting a beam training procedure packet shared between the multiple transmit antenna main beam direction.

In Example 36, the subject matter of Example 35 may optionally include the beam training procedure packet comprising training signals for each transmit antenna main beam direction of the multiple transmit antenna main beam direction.

In Example 37, the subject matter of any one of Examples 21-36 may optionally include performing the beam training procedure comprising transmitting a training signal using a combination of a multiple of transmit antenna main beam direction of the subset.

In Example 38, the subject matter of any one of Examples 21-37 may optionally include performing the communication based on one of the determined antenna weight vectors and storing at least one other of the determined antenna weight vectors as backup in case a communication path corresponding to the antenna weight vector based on which communication being performed being obstructed.

Example 39 is a computer readable medium having recorded instructions thereon which, when executed by a processor, make the processor perform a method for communication according to any one of Examples 1 to 38.

Example 40 is a communication device as illustrated in FIG. 8.

In Example 41, the subject matter of Example 40 may optionally include the communication circuit being configured to perform the communication based on a selected one of the determined antenna weight vectors.

In Example 42, the subject matter of any one of Examples 40-41 may optionally include the communication circuit being configured to perform, for each transmit antenna main beam direction of the subset, a first beam training procedure to determine an antenna weight vector for a receive antenna of the receiver and the communication circuit being configured to perform, for each transmit antenna main beam direction of the subset, a second beam training procedure to determine an antenna weight vector for a transmit antenna of the sender.

In Example 43, the subject matter of any one of Examples 40-42 may optionally include the antenna weight vector being an antenna weight vector for a receive antenna of the receiver.

In Example 44, the subject matter of Example 43 may optionally include the beam training procedure comprising, for each of a plurality of training antenna weight vectors, the reception of a signal transmitted or received using the training antenna weight vector.

In Example 45, the subject matter of any one of Examples 43-44 may optionally include the beam training procedure comprising the reception of a beam training procedure packet.

In Example 46, the subject matter of any one of Examples 43-45 may optionally include the beam training procedure being a receiver beam training procedure.

In Example 47, the subject matter of any one of Examples 43-46 may optionally include the beam training procedure comprising, for each of a plurality of training receive antenna weight vectors, the reception of a signal using the training receive antenna weight vector.

In Example 48, the subject matter of any one of Examples 40-47 may optionally include the antenna weight vector being an antenna weight vector for a transmit antenna of the sender.

In Example 49, the subject matter of Example 48 may optionally include the beam training procedure being a transmitter beam training procedure.

In Example 50, the subject matter of any one of Examples 48-49 may optionally include the beam training procedure comprising, for each of a plurality of training transmit antenna weight vectors, the reception of a signal transmitted using the training transmit antenna weight vector.

In Example 51, the subject matter of Example 50 may optionally include a signaling circuit configured to signal, for each transmit antenna main beam direction, a result of the transmitter beam training procedure to the sender.

In Example 52, the subject matter of Example 51 may optionally include the result comprising an indication of a reception qualities of training signals sent for different transmit antenna weight vectors.

In Example 53, the subject matter of any one of Examples 40-52 may optionally include the communication circuit being configured to determine, for each transmit antenna main beam direction, an antenna weight vector for the transmit antenna main beam direction and the communication circuit being configured to select an antenna weight vector for the receive antenna of the receiver from the determined antenna weight vectors.

In Example 54, the subject matter of any one of Examples 40-53 may optionally include the communication circuit being configured to perform the beam training procedure for multiple transmit antenna main beam directions of the subset by receiving a beam training procedure packet shared between the multiple transmit antenna main beam direction.

In Example 55, the subject matter of Example 54 may optionally include the beam training procedure packet comprising training signals for each transmit antenna main beam direction of the multiple transmit antenna main beam direction.

In Example 56, the subject matter of any one of Examples 40-55 may optionally include performing the beam training procedure comprising receiving a training signal transmitted using a combination of a multiple of transmit antenna main beam direction of the subset.

In Example 57, the subject matter of Example 56 may optionally include performing the beam training procedure comprising processing the training signal using multiple taps, wherein each tap corresponds to a transmit antenna main beam direction of the multiple of transmit antenna main beam direction of the subset.

In Example 58, the subject matter of any one of Examples 57- may optionally include each transmit antenna main beam direction corresponding to at least one tap of the multiple taps.

In Example 59, the subject matter of any one of Examples 40-58 may optionally include the communication circuit being configured to perform the communication based on one of the determined antenna weight vectors and the communication circuit being configured to store at least one other of the determined antenna weight vectors as backup in case a communication path corresponding to the antenna weight vector based on which communication being performed being obstructed.

Example 60 is a communication device as illustrated in FIG. 9.

In Example 61, the subject matter of Example 60 may optionally include the communication circuit being configured to perform the communication based on a selected one of the determined antenna weight vectors.

In Example 62, the subject matter of any one of Examples 60-61 may optionally include the communication circuit being configured to perform, for each transmit antenna main beam direction of the subset, a first beam training procedure to determine an antenna weight vector for a receive antenna of the receiver and the communication circuit being configured to perform, for each transmit antenna main beam direction of the subset, a second beam training procedure to determine an antenna weight vector for a transmit antenna of the sender.

In Example 63, the subject matter of any one of Examples 60-62 may optionally include the antenna weight vector being an antenna weight vector for a transmission antenna of the sender.

In Example 64, the subject matter of Example 63 may optionally include the beam training procedure comprising, for each of a plurality of training antenna weight vectors, the transmission of a signal transmitted or received using the training antenna weight vector.

In Example 65, the subject matter of any one of Examples 63-64 may optionally include the beam training procedure comprising the transmission of a beam training procedure packet.

In Example 66, the subject matter of any one of Examples 63-65 may optionally include the beam training procedure being a transmitter beam training procedure.

In Example 67, the subject matter of any one of Examples 63-66 may optionally include the beam training procedure comprising, for each of a plurality of training receive antenna weight vectors, the transmission of a signal using the training receive antenna weight vector.

In Example 68, the subject matter of any one of Examples 60-67 may optionally include the antenna weight vector being an antenna weight vector for a receive antenna of the receiver.

In Example 69, the subject matter of Example 68 may optionally include the beam training procedure being a receiver beam training procedure.

In Example 70, the subject matter of any one of Examples 68-69 may optionally include the beam training procedure comprising, for each of a plurality of training receive antenna weight vectors, the transmission of a signal received using the training receive antenna weight vector.

In Example 71, the subject matter of Example 70 may optionally include receiving, for each transmit antenna main beam direction, a result of the transmitter beam training procedure from the receiver.

In Example 72, the subject matter of Example 71 may optionally include the result comprising an indication of a reception qualities of training signals sent for different transmit antenna weight vectors.

In Example 73, the subject matter of any one of Examples 60-72 may optionally include the communication circuit being configured to determine, for each transmit antenna main beam direction, an antenna weight vector for the transmit antenna main beam direction and selecting an antenna weight vector for the transmit antenna of the sender from the determined antenna weight vectors.

In Example 74, the subject matter of any one of Examples 60-73 may optionally include the communication circuit being configured to perform the beam training procedure for multiple transmit antenna main beam directions of the subset by transmitting a beam training procedure packet shared between the multiple transmit antenna main beam direction.

In Example 75, the subject matter of Example 74 may optionally include the beam training procedure packet comprising training signals for each transmit antenna main beam direction of the multiple transmit antenna main beam direction.

In Example 76, the subject matter of any one of Examples 60-75 may optionally include performing the beam training procedure comprising transmitting a training signal using a combination of a multiple of transmit antenna main beam direction of the subset.

In Example 77, the subject matter of any one of Examples 60-76 may optionally include the communication circuit being configured to perform the communication based on one of the determined antenna weight vectors and storing at least one other of the determined antenna weight vectors as backup in case a communication path corresponding to the antenna weight vector based on which communication being performed being obstructed.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication method comprising:
receiving, for each transmit antenna main beam direction of a plurality of transmit antenna main beam directions, a message from a sender transmitted in the transmit antenna main beam direction of a transmit antenna of the sender, wherein the message is received by a receive antenna of a receiver configured as an omnidirectional antenna;
determining, for each transmit antenna main beam direction of the plurality of transmit antenna main beam directions, a reception quality of the message transmitted in the transmit antenna main beam direction;
identifying a subset of the plurality of transmit antenna main beam directions based on the reception qualities of the messages, wherein the subset includes multiple transmit antenna main beam directions of the plurality of transmit antenna main beam directions;
providing to the sender information identifying each of the multiple transmit antenna main beam directions of the subset, wherein each identified transmit antenna main beam direction is associated with a candidate reflection of the message;
performing, for each transmit antenna main beam direction of the subset, a beam training procedure to determine an antenna weight vector; and
performing a communication based on one of the determined antenna weight vectors.

2. The method of claim 1, further comprising performing, for each transmit antenna main beam direction of the subset, a first beam training procedure to determine an antenna weight vector for a receive antenna of the receiver and comprising performing, for each transmit antenna main beam direction of the subset, a second beam training procedure to determine an antenna weight vector for a transmit antenna of the sender.

3. The method of claim 1, wherein the antenna weight vector is an antenna weight vector for a receive antenna of the receiver.

4. The method of claim 1, wherein the antenna weight vector is an antenna weight vector for a transmit antenna of the sender.

5. The method of claim 1, further comprising determining, for each transmit antenna main beam direction, an antenna weight vector for the transmit antenna main beam direction and selecting an antenna weight vector for the receive antenna of the receiver from the determined antenna weight vectors.

6. The method of claim 1, further comprising performing the beam training procedure for multiple transmit antenna main beam directions of the subset by receiving a beam training procedure packet shared between the multiple transmit antenna main beam direction.

7. The method of claim 1, wherein performing the beam training procedure comprises receiving a training signal transmitted using a combined antenna weight vector, the combined antenna weight vector being based on a combination of the multiple transmit antenna main beam directions of the subset.

8. The method of claim 1, further comprising performing the communication based on one of the determined antenna weight vectors and storing at least one other of the determined antenna weight vectors as backup in case a communication path corresponding to the antenna weight vector based on which communication is performed is obstructed.

9. The method of claim 3, wherein the beam training procedure comprises, for each of a plurality of training antenna weight vectors, the reception of a signal transmitted or received using the training antenna weight vector.

10. The method of claim 3, wherein the beam training procedure comprises the reception of a beam training procedure packet.

11. The method of claim 3, wherein the beam training procedure is a receiver beam training procedure.

12. The method of claim 3, wherein the beam training procedure comprises, for each of a plurality of training receive antenna weight vectors, the reception of a signal using the training receive antenna weight vector.

13. The method of claim 4, wherein the beam training procedure is a transmitter beam training procedure.

14. The method of claim 4, wherein the beam training procedure comprises, for each of a plurality of training transmit antenna weight vectors, the reception of a signal transmitted using the training transmit antenna weight vector.

15. The method of claim 6, wherein the beam training procedure packet comprises training signals for each transmit antenna main beam direction of the multiple transmit antenna main beam direction.

16. The method of claim 7, wherein performing the beam training procedure comprises processing the training signal using multiple taps, wherein each tap corresponds to a transmit antenna main beam direction of the combination of the multiple transmit antenna main beam directions of the subset.

17. The method of claim 14, further comprising signaling, for each transmit antenna main beam direction, a result of the transmitter beam training procedure to the sender.

18. The method of claim 16, wherein each transmit antenna main beam direction corresponds to at least one tap of the multiple taps.

19. The method of claim 17, wherein the result comprises an indication of a reception qualities of training signals sent for different transmit antenna weight vectors.

20. A communication method comprising:
transmitting, for each transmit antenna main beam direction of a plurality of transmit antenna main beam directions, a message to a receiver in the transmit antenna main beam direction of a transmit antenna of the sender, wherein the message is configured to be received by an omnidirectional antenna;
receiving information identifying a subset of the plurality of transmit antenna main beam directions, wherein the subset includes multiple transmit antenna main beam directions of the plurality of transmit antenna main beam directions selected based on reception qualities of the messages, wherein each identified transmit antenna main beam direction of the subset is associated with a candidate reflection the message;

performing, for each transmit antenna main beam direction of a subset of a plurality of transmit antenna main beam directions, identified based on reception qualities of the messages, wherein the subset includes multiple transmit antenna main beam directions of the plurality of transmit antenna main beam directions, a beam training procedure to determine an antenna weight vector for the transmit antenna main beam direction;

performing a communication based on one of the determined antenna weight vectors.

21. A communication device comprising:

a receiver configured to receive, for each transmit antenna main beam direction of a plurality of transmit antenna main beam directions, a message from a sender transmitted in the transmit antenna main beam direction of a transmit antenna of the sender, wherein a receive antenna of the receiver is configured as an omnidirectional antenna;

a determiner configured to determine, for each transmit antenna main beam direction of the plurality of transmit antenna main beam directions, a reception quality of the message transmitted in the transmit antenna main beam direction;

a controller configured to identify a subset of the plurality of transmit antenna main beam directions based on the reception qualities of the messages, wherein the subset includes multiple transmit antenna main beam directions of the plurality of transmit antenna main beam directions;

a transmitter configured to provide to the sender information identifying each of the multiple transmit antenna main beam directions of the subset, wherein each identified transmit antenna main beam direction is associated with a candidate reflection of the message; and a communication circuit configured to perform, for each transmit antenna main beam direction of the subset, a beam training procedure to determine an antenna weight vector for the transmit antenna main beam direction and configured to perform a communication based on one of the determined antenna weight vectors.

22. A communication device comprising:

a transmitter configured to transmit, for each transmit antenna main beam direction of a plurality of transmit antenna main beam directions, a message to a receiver in the transmit antenna main beam direction of a transmit antenna of the sender, wherein the message is configured to be received by an omnidirectional antenna;

a processor configured to receive information identifying a subset of the plurality of transmit antenna main beam directions, wherein the subset includes multiple transmit antenna main beam directions of the plurality of transmit antenna main beam directions selected based on reception qualities of the messages, wherein each identified transmit antenna main beam direction of the subset is associated with a candidate reflection the message; and a communication circuit configured to perform, for each transmit antenna main beam direction of a subset of a plurality of transmit antenna main beam directions, identified based on reception qualities of the messages, wherein the subset includes multiple transmit antenna main beam directions of the plurality of transmit antenna main beam directions, a beam training procedure to determine an antenna weight vector for the transmit antenna main beam direction and configured to perform a communication based on one of the determined antenna weight vectors.

* * * * *